US008682268B2

(12) United States Patent
Cimaz

(10) Patent No.: US 8,682,268 B2
(45) Date of Patent: Mar. 25, 2014

(54) NOISE SUPPRESSION

(75) Inventor: Lionel Cimaz, Pleumeleuc (FR)

(73) Assignee: Ericsson Modems SA, Plan-les-Ouates (CH)

( * ) Notice: Subject to any disclaimer, the term of this patent is extended or adjusted under 35 U.S.C. 154(b) by 0 days.

(21) Appl. No.: 13/264,102

(22) PCT Filed: Apr. 14, 2010

(86) PCT No.: PCT/EP2010/054905
§ 371 (c)(1), (2), (4) Date: Jan. 4, 2012

(87) PCT Pub. No.: WO2010/119074
PCT Pub. Date: Oct. 21, 2010

(65) Prior Publication Data

US 2012/0171974 A1 Jul. 5, 2012

(30) Foreign Application Priority Data

Apr. 15, 2009 (EP) .................................... 09305321

(51) Int. Cl.
*H04B 1/04* (2006.01)

(52) U.S. Cl.
USPC .................... 455/114.2; 455/522; 455/552.1; 455/570

(58) Field of Classification Search
USPC ....................................................... 455/114.2
See application file for complete search history.

(56) References Cited

U.S. PATENT DOCUMENTS

| | | | | |
|---|---|---|---|---|
| 5,903,853 | A * | 5/1999 | Sano | 455/570 |
| 6,122,265 | A * | 9/2000 | Nakamura et al. | 370/332 |
| 6,711,259 | B1 * | 3/2004 | Haimi-Cohen et al. | 379/391 |
| 2002/0193134 | A1 * | 12/2002 | Kim | 455/522 |
| 2003/0228890 | A1 * | 12/2003 | Falaki | 455/574 |
| 2006/0182268 | A1 * | 8/2006 | Marton | 379/406.08 |
| 2007/0004447 | A1 * | 1/2007 | Haartsen | 455/552.1 |

FOREIGN PATENT DOCUMENTS

| | | | |
|---|---|---|---|
| EP | 1876723 | A | 1/2008 |
| WO | 00/38180 | A | 6/2000 |
| WO | 00/76267 | A | 12/2000 |
| WO | 02/056511 | A | 7/2002 |
| WO | 2006/118464 | A | 11/2006 |

OTHER PUBLICATIONS

International Search Report for PCT/EP2010/054905 mailed May 18, 2010.
Written Opinion for PCT/EP2010/054905 mailed May 18, 2010.
Chinese Office Action in corresponding Chinese Application No. 201080026348.8 dated Oct. 10, 2013.

* cited by examiner

*Primary Examiner* — Ajibola Akinyemi
(74) *Attorney, Agent, or Firm* — Patent Portfolio Builders PLLC

(57) ABSTRACT

The present invention relates to a method of suppressing noise in a communication device. The idea consists in forwarding to a noise suppression module some information regarding the radio transmission in terms of radio activity and/or in terms of radio transmission power. The module then advantageously uses this information to suppress radio path noise.

11 Claims, 4 Drawing Sheets

NOISE SUPPRESSION

TECHNICAL FIELD

The present invention relates to a method of noise suppression. More specifically, the proposed method is able to suppress total noise, including burst noise on audio path. The invention equally relates to a corresponding module for suppressing noise, to mobile equipment comprising the module and to a computer program product comprising instructions for implementing the steps of the method.

BACKGROUND OF THE INVENTION

In a system where radio signal bursts are present while having audio channel open, a common audio noise problem appears called "burst noise" or "time division multiplexing access (TDMA) noise". This problem is particularly present on uplink paths where a microphone is the electrical source of audio. In fact, microphone signal is very low, around mV, and any noise above μV can be heard. The burst noise can be really annoying and advantageously has to be removed.

This burst noise exists in the audio channel due to two common coupling mechanisms used in radio transmissions:

A radio power amplifier consumes significant amount of current when transmitting while the current consumption is very low when not transmitting. This current consumption variation is creating a voltage variation on the battery supply for the entire product due to battery impedance. The audio portion of the system is powered by the same battery voltage. Consequently, depending on the power supply rejection ratio of the solution, this signal is partly injected into the audio path.

During radio transmission, a significant electromagnetic field is created on the product due to antenna. A relatively big part of this radio signal is going to be injected into the audio portion. Because the composition of audio system is based on transistors which are mostly non linear, the radio signal is rectified. Due to the rectification, radio signals inject direct current (DC) component into the audio path. As radio activity comprises signal bursts, the presence of the DC component is not continuous. This results in an audio noise coupled with the radio power amplifier activities.

Thus, a radio activity comprising signal bursts is by itself creating noise on the audio path. This noise level is not constant in time:

GSM/GPRS/EDGE phones have the capability of operating in discontinuous transmission mode, also referred to as DTX, in order to reduce current consumed by the phone. This occurs when the local voice is not active. Under such conditions the burst noise will be discontinuous as well.

GSM/GPRS/EDGE phones have the capability of changing the power of the radio transmission. Then, the burst noise level will follow the power change of the radio.

Different coupling gains between radio portion and audio path are not static. In fact, the local environment of the phone affects the antenna and the radiation and/or receiving pattern. Then the radio power amplifier could consume variable amount of current and the portion of radio signal injected into an audio path can vary. This results in non-fixed coupling gains meaning a non-fixed level of burst noise.

Several solutions are known to reduce burst noise. First, one solution is based on reducing coupling gains. The burst noise is created from the coupling of radio activity to the audio path. If this coupling gain is low enough, the resulting burst noise could be low enough not to be heard.

Reducing coupling gains involves the use of efficient power supply paths for audio to get high power supply rejection ratio. The battery impedance has to be low as well. The audio signal routed on a printed circuit board (PCB) needs to be protected, for instance routed by a pair and placed behind a shield. Some passive linear components have to be inserted at different locations to evacuate the radio signal from the audio lines.

This method has the disadvantage that the addition of passive components and efficient power supply paths has a cost. The routing of audio lines on PCB can be very painful. On some products, because of their size and mechanic arrangement, it is even not possible to remove completely the burst noise.

Second, another method of reducing burst noise is based on a burst noise filter. The burst noise by itself follows the signal bursts. In a GSM/GPRS/EDGE phone, the standard specifies that a transmit burst occurs once in a period of 4.615 ms in continuous transmission and most of time at the same location, i.e. the same time slot. Because of that, the burst noise will be a signal composed by a fundamental at 216.7 Hz (1/4.615 ms) and its harmonics. So, it is possible to build a filter which rejects only these frequencies resulting in the removing of burst noise.

However, this method also has a drawback, namely because of the filter insertion, the voice signal itself suffers attenuation on the rejected frequencies. For this reason, the voice quality can be significantly damaged.

Third, still another method is based on a noise suppressor. For different reasons phones embed a noise suppressor. The algorithm used in noise suppressors can be based on spectral subtraction technique. Its functioning principle is to estimate the noise spectrum in absence of speech activity and to subtract in frequency domain this estimated noise. As noise shape is quite constant compared to voice activity, the subtraction of it is still valid even during speech periods. This results in the cancellation of noise even with presence of a speech signal. In continuous transmission, the burst noise has also a quite constant shape and spectrum. Then, the generic noise suppressor will have cancellation ability for it, resulting in a reduction of burst noise.

However, as explained above, the burst noise has constant shape only in the continuous transmission phase. When a phone is operating in discontinuous transmission mode, the spectrum of the noise is no more constant and the noise suppressor is not be able to correctly estimate it, resulting in non efficient cancellation. Furthermore, GSM/GPRS/EDGE phones can adapt suddenly the power of their radio transmission resulting in a new spectrum composition of the burst noise. This drives also to a bad estimation of noise by the noise suppressor resulting in a suboptimal noise cancellation. So, the noise suppressor cannot take into account sudden spectral changes. For this reason, the noise suppressor does not work properly in systems based on GPRS (because several time slots can be used for transmission in one frame) or in some 3G systems (because of too complex and non-constant spectrum).

It is thus the object of the present invention to overcome the above-identified difficulties and disadvantages by proposing an improved solution for noise cancellation.

SUMMARY OF THE INVENTION

According to a first aspect of the invention, there is provided a method of noise suppression for a noise suppression module in a communication device, the module being coupled to a radio transmitter, wherein the module receives information regarding at least one of radio transmission activity and radio transmission power; and the module suppressing, based on the received information, audio path noise.

Thus, the present invention provides a very efficient method for noise suppression preserving the voice quality. Furthermore, the burst noise suppression is continuous. The proposed method is able to cancel burst noise correctly when radio state changes even during active speech (during this time, noise estimation is generally stopped). Because of efficient burst noise cancellation, the PCB routing of the device is easier and some components could even be removed.

According to a second aspect of the invention, there is provided a computer program product comprising instructions for implementing the method according to the first aspect of the invention when loaded and run on computer means of a communication device.

According to a third aspect of the invention, there is provided a module for noise suppression for a communication device, where the module is coupled to a radio transmitter, the module being arranged to receive information regarding at least one of radio transmission activity and radio transmission power; and to suppress audio path noise based on the received information.

According to a fourth aspect of the invention, there is provided mobile equipment, such as a mobile phone, comprising the module for noise suppression.

Other aspects of the invention are recited in the dependent claims attached hereto.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

Next some embodiments of the present invention are described in more detail with reference to the attached figures.

Figure 1:
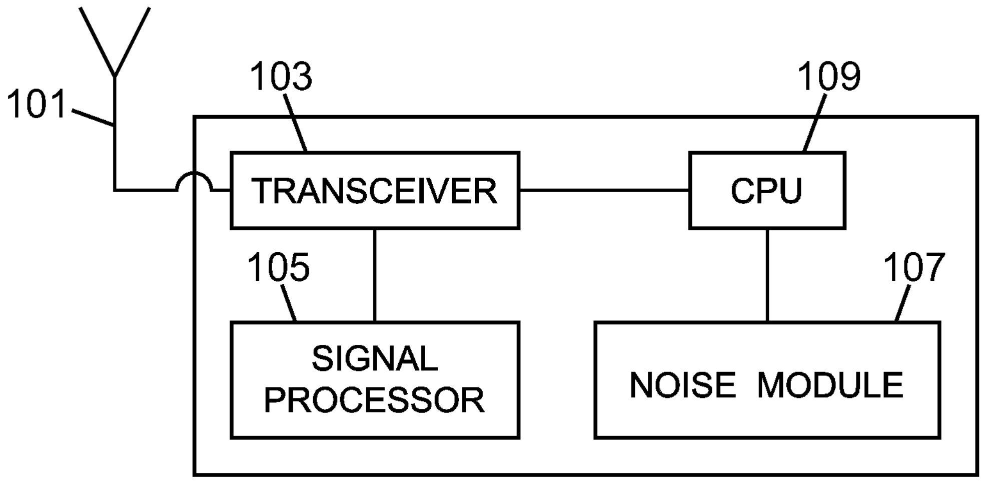
FIG. 1 shows a simplified block diagram of a communication device.

FIG. 1 shows a simplified block diagram of a communication device 100 that is arranged to implement the noise suppression method in accordance with the present invention. An antenna 101 is arranged to receive radio signals and they are then fed to a transceiver unit 103. A signal processor 105 processes the received signal. Operations such as demodulation and decoding are well known to a skilled person in the art. The processed signal is then fed to a noise module 107 of which operation is explained in more detail later on. A central processing unit (CPU) 109 controls the overall operation of the device and is also arranged to change radio transmission characteristics. In one implementation the signal processing and the noise suppression run on the CPU.

In the first embodiment, the idea is based on the noise suppressor of which operation was briefly explained earlier. In fact, the proposed noise suppression method is by essence adaptive and would then track the variation of burst noise level or spectrum linked to variation of phone local environment.

The idea consists in forwarding to the noise module 107, in this case called noise suppressor, some information regarding the radio transmission in terms of radio activity (informing about continuous/discontinuous transmission) and in terms of radio transmission power. This information is then treated by the noise suppressor 107 to predict a correction for the estimated noise. Because in the present invention the estimated noise will track the variation of radio transmission, the noise suppression will be continuous on the burst noise itself.

The GSM/GPRS/EDGE phone protocol stack, in particular the layer 1 protocol layer, knows well what the radio transmission activity will be for the next coming 4.615 ms. The protocol stack knows as well at what power level the radio power amplifier is going to run. The information of radio transmission activity as well as radio power are forwarded to the noise suppressor 107.

The noise suppressor 107 is running in its general manner while the radio activity is constant. It will then estimate the general audio noise or the general audio noise+burst noise and it will make the subtraction of it from the audio signal. Here by general audio noise is understood the electrical noise of microphone/preamplifiers and acoustical noise in the room for instance.

When radio activity changes, the noise suppressor 107 will have to re-compute the estimated noise to track the variation it will have on burst noise. This re-computation is possible when the noise suppressor 107 is able to distinguish the general audio noise and the burst noise from its estimated total noise. The re-computation will then consist in calculating a new total estimated noise spectrum by combining bin to bin the estimated general audio noise spectrum with a corrected burst noise spectrum:

- If the radio power changes, the estimated burst noise spectrum is corrected by the same factor. For example, if radio power is passing from 33 dBm to 31 dBm, the estimated burst noise spectrum will be decreased by 2 dB.
- If the radio activity stops (discontinuous transmission mode when the radio is suspended), the corrected burst noise spectrum is null. The noise suppressor will then only suppress the general audio noise.
- If the radio activity starts (discontinuous transmission mode when the radio is restarting to transmit), the burst noise spectrum estimated at the previous radio activity phase is added to the general audio noise spectrum.

The key of operation is the capability for the noise suppressor 107 at radio state change to distinguish between general audio noise spectrum and burst noise spectrum in its total noise estimation. As explained above, in this example the burst noise signal is located specifically at 216.7 Hz and the consequent harmonics. Then, the distinction between general audio noise and burst noise will only consider the bins of spectrum associated with the 216.7 Hz and its harmonics.

Figure 2:
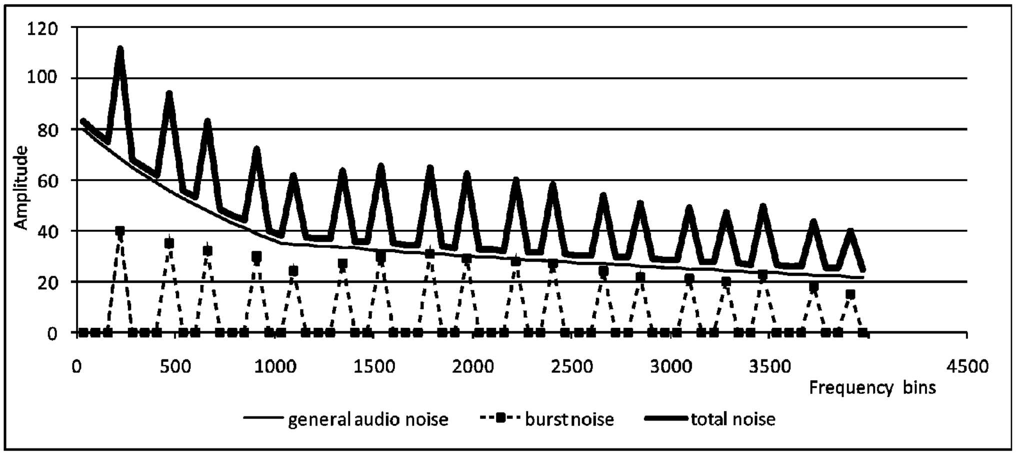
FIG. 2 shows a graph illustrating the decomposition of total noise into general audio noise and burst noise.

FIG. 2 illustrates the decomposition of total noise (bold graph) into general audio noise (thin graph) and burst noise (dashed graph). The spectrum is here decomposed into 64 bins in the 4 kHz band.

Several possibilities are available to make the distinction between the general audio noise and the burst noise. Next one simple approach is described.

Figure 3:
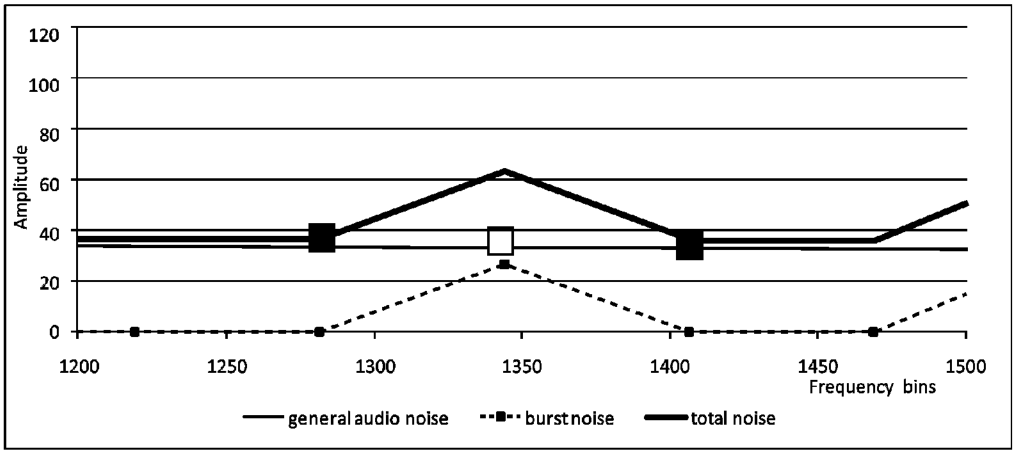
FIG. 3 shows another graph illustrating obtaining of the burst noise from the total noise.

In most cases, the general audio noise is spread, meaning that this noise has continuity from a spectrum bin to the adjacent bins. Considering a bin where burst noise is present, the general audio noise level in this bin is linked with the adjacent bins because of continuity. As the adjacent bins contain only the general audio noise due to the burst noise spectrum particularity, it is possible to extract the general audio noise level in the current bin by any approximation using the level of noise in the adjacent bins (linear regression, averaging, etc.). This is illustrated by FIG. 3, where the two filled squares represent adjacent bins to the bin where the burst noise is present. The average of these two bin levels gives the non-filled square in FIG. 3 which is matching well the general audio noise level in this bin.

Figure 4:
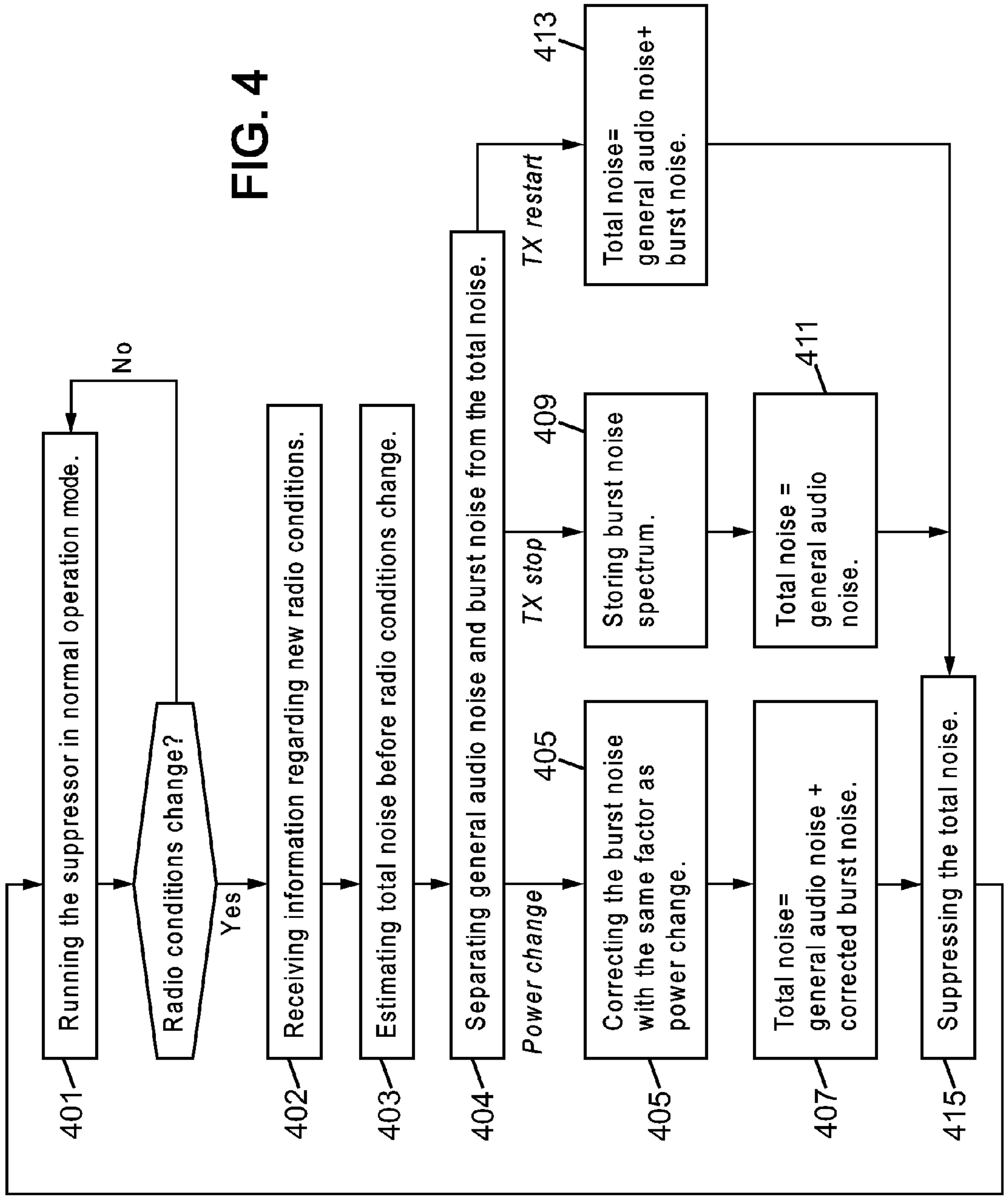
FIG. 4 is a flow chart illustrating a first embodiment for suppressing noise in accordance with the present invention.

Using a spectral subtraction noise suppressor, the idea is processed as below and with reference to the flow chart of FIG. 4, where tn[x] is the total noise level of bin x, gn[x] is the general audio noise level in bin x, bn[x] is the burst noise level of bin x:

1) In the absence of radio activity change, noise suppressor works in step 401 in traditional operation. It estimates the noise spectrum of audio path and subtracts it, whatever the content of noise. This estimated noise spectrum is the total noise spectrum combining general audio noise and burst noise.

2) At radio state change: The noise suppressor 107 receives in step 402 information regarding the change of radio transmission conditions. In step 403 the total noise level is estimated. The total noise spectrum is decomposed in step 404 into general audio noise and burst noise using the technique described above. However, in case of radio restarting transmission, the decomposition is not necessary as it contains only general audio noise, no burst noise. Therefore, the decomposition has to be done only when burst noise is probably present on the audio path. For each bin not falling into burst noise location, the general noise level in this bin is equal to the total noise level in the same bin and the burst noise in this bin is null (gn[i]=tn[i], bn[i]=0). For bins falling into the burst noise location, the general audio noise in that bin is equal to the average of the adjacent bins level of the total noise (gn[j]=0.5×tn[j−1]+0.5×tn[j+1]). The burst noise level in this bin before the radio conditions change is thus equal to the total noise level of the bin minus the calculated general noise level in this bin (bn[j]=tn[j]−gn[j]).

a. Case of Radio Power Change i. The burst noise spectrum is corrected in step 405 with the same factor than radio power change to obtain the burst noise after radio power change (bn[j]=bn[j]*factor).

ii. A new total noise after power change is generated in step 407 by recomposition of general audio noise and corrected burst noise (tn[j]=bn[j]+gn[j]).

b. Case of Radio Transmission Stop i. The total noise spectrum is decomposed into general audio noise and burst noise as explained in step 403.

ii. The burst noise spectrum is stored in step 409 to be used when the radio will start transmitting again.

iii. A new total noise after radio transmission stop is generated in step 411 by incorporating only the general audio noise (tn[i]=gn[i]) because burst noise will disappear.

c. Case of Radio Transmission Restarting i. A new total noise is generated in step 413 so that the total noise equals now the general audio noise+burst noise stored in step 409 or obtained in step 403.

3) The new total noise is updated in the noise suppressor 107 and the new updated noise can be suppressed in step 415. The process then continues in step 401 operating in standard mode.

Because this solution would require less care on radio to audio coupling gains while still obtaining good burst noise reduction, the input of the noise suppressor 107 could be exposed to high level of burst noise. Some noise suppressors use a voice activity detector to control their operation, in particular to enable the noise estimation or not. If burst noise is high enough, the control logic of noise suppressor 107 may deduce wrongly that voice is active and then stops noise estimation. This would result in poor burst noise suppression. In such a situation, it is beneficial to implement a 217 Hz and harmonics rejection filter before the voice activity detector.

Figure 5:
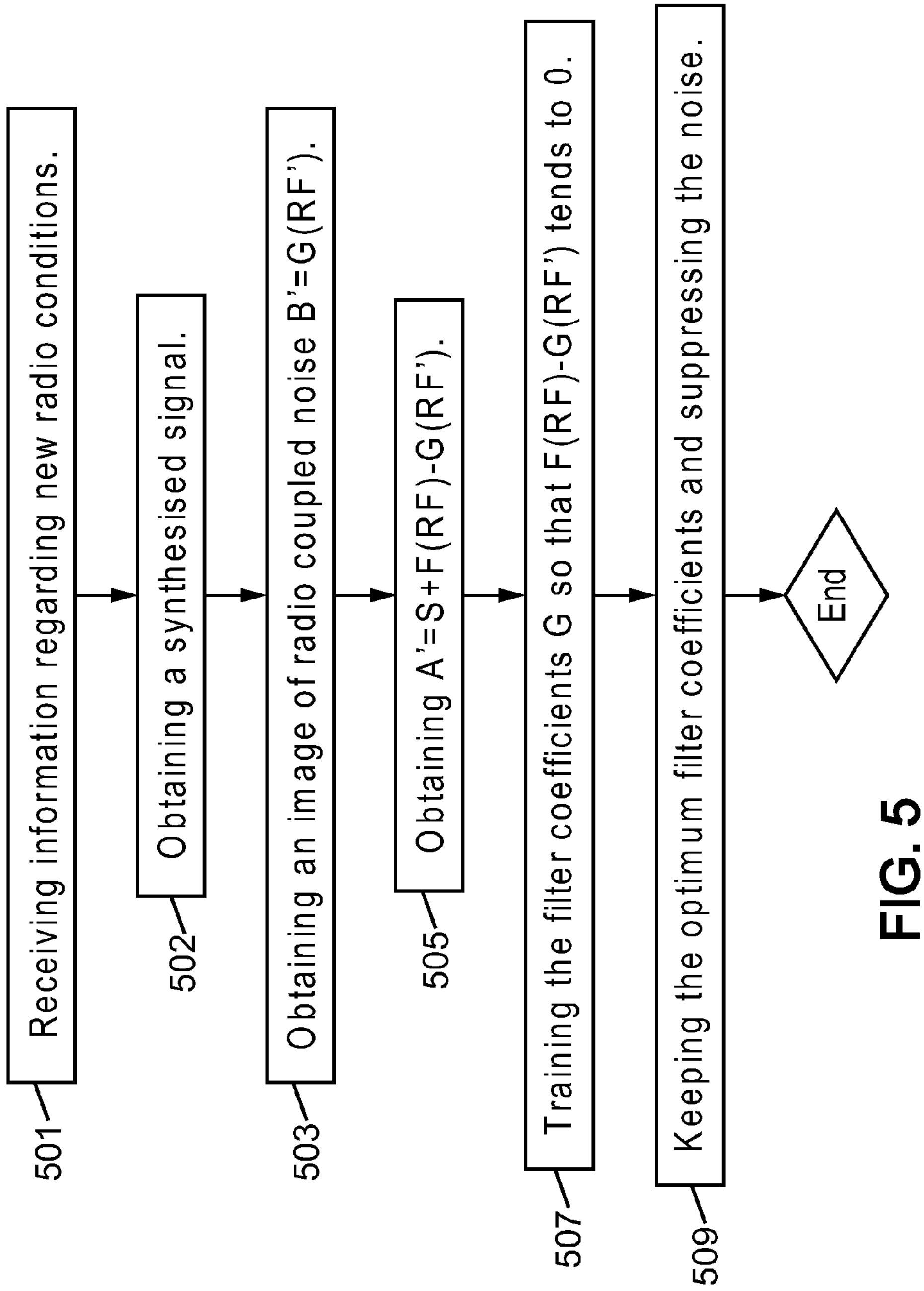
FIG. 5 is a flow chart illustrating a second embodiment for suppressing noise in accordance with the present invention.

The second embodiment of the present invention is described next with reference to the flow chart of FIG. 5. The idea is based on an adaptive filter, i.e. the noise module 107, trained to match a coupling transfer function between radio activities and an audio path. The key is to feed this filter with a synthesised or probed signal representing in time the radio activity. The output of the filter is subtracted from the audio path.

Considering that RF is the radio output level in time, F is the radio to audio coupling transfer function, we can write B as the radio coupled audio noise: B=F(RF). The audio path itself contains this noise but also the useful audio signal called S, so the audio path signal A is A=S+B=S+F(RF) which represents a useful signal with radio coupled audio noise.

In step 501 the filter receives information regarding new radio conditions. In step 502 a synthesised signal RF' is obtained which follows as close as possible the radio output level in time. Considering G being the transfer function of an adaptive filter, we obtain in step 503 an image B' of radio coupled audio noise: B'=G(RF'). Here the synthesised signal is understood to represent a signal similar to RF but in the audio band.

By subtracting B' from the audio path signal we obtain in step 505 an A' which is A'=A−B'=S+B−B'. Here A' represents a signal to be transmitted on uplink after having applied the teachings of this embodiment.

By substituting B and B' in the above formula we obtain A'=S+F(RF)−G(RF'). In the situation where G is close to F after any training mechanism in step 507 and RF' is close to RF, the part F(RF)−G(RF') will tend to 0. This also means that A'=S, in other words, the radio coupled audio noise is removed in step 509 from the path whatever the useful audio signal activity.

The key of system functioning is to get an RF' signal which matches well the level variation and timings of the audio noise coupled with radio activity. This signal has no requirement in matching delays or spectrum of the coupled noise, this part will be handled by the adaptive filter.

This RF' can be obtained by any suitable means:

Sampling using analogue to digital converter of the radio power emission directly at radio power amplifier.

Sampling using analogue to digital converter of the power amplifier current consumption if it matches indirectly the quantity of radio signal coupled in the audio path.

Sampling using any means of the digital to analogue converter used to control the radio amplifier power.

Synthesis of signal from information coming from the protocol stack.

The synthesis approach can be implemented on existing systems without needs of hardware modification. This synthesis is realised from information coming from protocol stack which controls the radio portion responsible for the audio noise. In fact, the protocol stack knows precisely the timing of radio activity and with what power level it runs. Then, for all known coming radio activities, a corresponding audio pattern is created. This audio pattern is a group of samples, each one representing the radio transmission level at a given time. The equivalent time distance between each sample is equal to the sampling rate of the audio subsystem.

The adaptive filter is basically built using finite impulse response (FIR) filtering. So $$B' = \sum_{i=0}^{N} G[i]RF'[i],$$

where N is the filter length, G[i] being the G filter coefficient at index i and RF'[i] being the RF' signal sample at index i. This filter is trained using any type of algorithms, such as normalised least mean square (NLMS) or fast affine projection (FAP). In the absence of speech signal and in the presence of radio activity, A' is expressed as A'=F(RF)−G(RF'). If G is not close to F, A' contains an error of adaptation E.

An NLMS implementation will be for each tap i of the filter:

$$G[i] = G[i] + \frac{\alpha \cdot E \cdot RF'[i]}{\text{Energy}},$$

where Energy is the energy of RF' vector which can be calculated by the sum of the square of RF' samples and a being the convergence speed.

The convergence speed is chosen fixed or dynamic following any type of decision in the system. The slower is the speed, the stable will be the adaptation but the initial time to cancel noise will be longer. The higher is the speed, the faster will be the initial time to cancel noise but the system could be unstable.

The training of an adaptive filter is only doable when the audio path contains causal effect of radio activity, i.e. the audio path is correlated with RF and RF'. So, a detection system has to be inserted to detect that effectively audio path contains mainly the radio coupled audio noise.

Considering that radio coupled noise remains significantly lower than the voice signal, a simple level detector placed before the solution could satisfy the detection. If the level is below a given threshold, the system considers that only radio coupled audio noise is present in the audio path and the adaptive filter training will be enabled.

More efficient detectors could be added. One could consist in adding a filter before a level detector to reject the radio coupled audio noise (only doable if noise has a known and fixed spectrum). In such case, the level detector becomes insensitive to the quantity of noise.

A detector could also be mapped at the output of a solution to obtain efficient information of voice activity. In fact, when the filter has converged, the level of radio coupled audio noise is null because cancelled, and there remains only the useful audio signal which can be easily level detected.

A combination of detectors can be implemented and from them, instead of simply enabling or disabling the training of an adaptive filter, it is possible to make variation of convergence speed following the probability of having audio path fully correlated with radio activities. Then, adaptation speed can be optimum while mitigating the risk of divergence.

In case of fixed and known spectrum particularities of the radio coupled audio noise, it is possible to decompose the audio path input before applying the solution and recompose it afterwards. For example, if noise is located always below 1 kHz, a perfect reconstruction filter could be inserted at the audio path input to decompose it by a signal representing the 0 to 1 kHz band and another for frequencies above 1 kHz. The 0 to 1 kHz band is processed by the solution which removes the radio coupled audio noise. Finally, the full bandwidth signal is recomposed taking the "above 1 kHz" signal directly and the output of the solution for the 0 to 1 kHz band. This option helps in the non addition of any artefact of the solution above 1 kHz resulting in a better sound quality.

Above two embodiments of the present invention were described. The second embodiment can also be applied to 3G in spite of frequent power control and to GPRS. On the other hand the first method might not work in an optimum way in these systems because of the non-constant spectrum in these systems.

The invention also relates to a computer program product that is able to implement any of the method steps as described above when loaded and run on computer means of a communication device. The computer program may be stored/distributed on a suitable medium supplied together with or as a part of other hardware, but may also be distributed in other forms, such as via the Internet or other wired or wireless telecommunication systems.

The invention also relates to an integrated circuit that is arranged to perform any of the method steps in accordance with the embodiments of the invention.

While the invention has been illustrated and described in detail in the drawings and foregoing description, such illustration and description are to be considered illustrative or exemplary and not restrictive, the invention being not restricted to the disclosed embodiments. Other variations to the disclosed embodiments can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method of noise suppression for a noise suppression module in a communication device, the module being coupled to a radio transmitter, the method comprising:

the module receiving information regarding at least one of the following: radio transmission activity and radio transmission power; the module suppressing, based on the received information, audio path noise; and decomposing, before changing the radio transmission activity or the radio transmission power, the noise into general audio noise and burst noise, wherein the decomposition comprises considering a frequency bin where burst noise is present and taking two adjacent frequency bins which are free from burst noise and determining the level of general audio noise in these two bins, then applying linear regression, interpolation or averaging to the general audio noise values of these two bins to estimate general audio noise in the frequency bin where burst noise is present, then taking a previous measurement result of the total noise for a bin where burst noise is present and obtaining the burst noise before the change of the radio transmission activity or radio transmission power by subtracting the general audio noise from the total noise.

2. The method according to claim 1, wherein the method further comprising estimating, before changing the radio transmission activity or the radio transmission power, the audio path noise.

3. The method according to claim 1, wherein the burst noise, after the radio transmission power change, is obtained by correcting the burst noise before the radio transmission power change by the same amount as the radio transmission power change.

4. The method according to claim 3, wherein the audio path noise is obtained by adding up the corrected burst noise and the general audio noise.

5. The method according to claim 1, wherein in case of radio transmission stop the audio path noise after the radio transmission stop equals the general audio noise level.

6. The method according to claim 1, wherein in case of radio transmission restart, the audio path noise is obtained by taking the audio path noise measured when the radio was transmitting.

7. The method according to claim 1, wherein the received information represents a synthesised or probed signal representing in time the radio transmission activity or the radio transmission power.

8. The method according to claim 7, wherein the synthesised signal is based on information received from a protocol stack of the communication device, where the protocol stack controls the operation of the radio transmitter.

9. The method according to claim 7, wherein once the synthesised signal is obtained, then obtaining estimated audio path noise, which is a filter transfer function of the module in function of the synthesised signal.

10. The method according to claim 9, wherein the noise suppression comprises training the filter coefficients so that the estimated noise subtracted from a radio path coupling function in function of radio signal output level in time tends to zero.

11. A non-transitory computer program product comprising instructions for implementing the steps of a method according to claim 1 when loaded and run on computer means of a communication device.

* * * * *